(12) United States Patent
Ciampini et al.

(10) Patent No.: US 8,197,033 B2
(45) Date of Patent: Jun. 12, 2012

(54) INK JET CARTRIDGE COMPRISING A LAYER MADE BY A CURABLE RESIN COMPOSITION

(75) Inventors: Davide Ciampini, Arnad (IT); Fulvio Cominetti, Arnad (IT); Luigina Gino, Arnad (IT)

(73) Assignee: Telecom Italia S.p.A., Milan (IT)

( * ) Notice: Subject to any disclaimer, the term of this patent is extended or adjusted under 35 U.S.C. 154(b) by 422 days.

(21) Appl. No.: 12/373,680

(22) PCT Filed: Jul. 13, 2006

(86) PCT No.: PCT/EP2006/006846
§ 371 (c)(1),
(2), (4) Date: Mar. 19, 2009

(87) PCT Pub. No.: WO2008/006390
PCT Pub. Date: Jan. 17, 2008

(65) Prior Publication Data
US 2009/0252923 A1 Oct. 8, 2009

(51) Int. Cl.
*B41J 2/05* (2006.01)
*G03F 7/00* (2006.01)
*B41J 2/14* (2006.01)

(52) U.S. Cl. ........ 347/65; 430/280.1; 522/170; 522/168

(58) Field of Classification Search .............. 347/65; 522/168, 170; 430/280.1
See application file for complete search history.

(56) References Cited

U.S. PATENT DOCUMENTS

| | | | |
|---|---|---|---|
| 4,087,585 A | 5/1978 | Schulz | |
| 4,337,103 A | 6/1982 | Elrick et al. | |
| 5,150,132 A | 9/1992 | Shimomura et al. | |
| 5,194,649 A | 3/1993 | Okawa | |
| 5,248,715 A | 9/1993 | Gray et al. | |
| 5,478,606 A | 12/1995 | Ohkuma et al. | |
| 5,744,507 A | 4/1998 | Angell et al. | |
| 6,193,359 B1 | 2/2001 | Patil et al. | |
| 6,455,112 B1 | 9/2002 | Ohkuma et al. | |
| 6,515,046 B2* | 2/2003 | Okada et al. | 523/456 |
| 6,638,439 B2 | 10/2003 | Shimomura | |
| 6,793,326 B2 | 9/2004 | Imamura et al. | |
| 6,932,882 B2* | 8/2005 | Haruta et al. | 156/306.3 |
| 7,175,973 B2* | 2/2007 | Okano et al. | 430/320 |

(Continued)

FOREIGN PATENT DOCUMENTS
EP    1 251 151 A2    10/2002
(Continued)

OTHER PUBLICATIONS

International Search Report dated Mar. 15, 2007, issued in PCT/EP2006/006846.

*Primary Examiner* — Susan W Berman
(74) *Attorney, Agent, or Firm* — Venable LLP; Robert Kinberg; Steven J. Schwarz

(57) ABSTRACT

The present invention relates to a curable resin composition comprising a cyclic aliphatic multifunctional epoxy resin, a cyclic aliphatic difunctional epoxy resin having formula B in the specification, and, optionally, a photoinitiator, a process for manufacturing an ink jet printhead comprising a polymeric material layer defining ink passage ways formed by curing said curable resin composition, and ink-jet print head comprising a polymeric material layer defining ink passage ways formed by curing said curable resin composition.

28 Claims, 3 Drawing Sheets

U.S. PATENT DOCUMENTS

| | | | |
|---|---|---|---|
| 7,472,480 B2 * | 1/2009 | Igarashi et al. | 29/890.1 |
| 7,687,552 B2 * | 3/2010 | Otaka et al. | 522/170 |
| 7,786,224 B2 * | 8/2010 | Takai | 525/524 |
| 7,854,065 B2 * | 12/2010 | Saito et al. | 29/890.1 |
| 2005/0046662 A1 | 3/2005 | Okano et al. | |

FOREIGN PATENT DOCUMENTS

| | | |
|---|---|---|
| EP | 1 389 615 A1 | 2/2004 |
| WO | WO-2006/001532 A1 | 1/2006 |
| WO | WO-2006/067814 A1 | 6/2006 |

* cited by examiner

INK JET CARTRIDGE COMPRISING A LAYER MADE BY A CURABLE RESIN COMPOSITION

BACKGROUND OF THE INVENTION

1. Field of the Invention

The present invention relates to an ink jet print head comprising a layer made by an improved curable resin composition, a process for the manufacturing thereof, and an improved curable resin composition.

2. Description of Related Art

The ink jet print head of an ink jet printer generally comprises a substrate, a barrier layer and a nozzle plate. The substrate is generally made of silicon. Various layers are deposited on a face of the silicon substrate to make up the ejection resistors and the active electronic components. The barrier layer is generally made of a photopolymer. Using photolithographic techniques, the ejection chambers and the microidraulic conducts for the ink delivery are realized in the photopolymer barrier layer. The nozzle plate is generally made of a plastic material, such as, for example, polyimide, or a metallic material, such as, for example, palladium plated nickel, rhodium plated nickel, or gold plated nickel. The nozzle plate provided with ejection nozzles made in correspondence with the ejection resistors and the ejection chambers is attached to the barrier layer.

In recent years, the nozzle plate has been made integrally with the barrier layer. The layer forming the barrier layer and the nozzle plate is known in the art as structural layer. In such a case, the manufacturing process includes a step of forming a pattern of the ejection chambers and the microidraulic conducts with a soluble resin or a metal, a step of coating a photopolymer covering the soluble resin or metal pattern, a step of forming orifices in the photopolymer in correspondence of the ejection chambers over the ejection resistors, a step of curing the photopolymer, and a step of dissolving the soluble resin or metal.

There are several problems which arise with respect to the photopolymer employed to make either the barrier layer or the structural layer.

The first problem is that the ink chemically attacks the photopolymer material and causes either leakage between the channels and/or leakage to the outside of the printheads and also causes swelling of the barriers. Swelling results in a change in channel geometry and a degradation from optimized performance. The problem of chemical attack is especially important with inks having pH's in excess of 7 and highly penetrating cosolvents.

The second problem is the resolution required upon patterning with a radiation source. The manufacturing of barrier or structural layers requires a resolution of approximately 20 micron which is in between the typical specifications of materials for printed circuit board, which have a resolution of approximately 200 micron and those for integrated circuits, which have a resolution of approximately 1 micron. The materials commonly used in the manufacture of printed circuit boards can not be used because these materials do not provide the high order of resolution that is required. If these materials are used to fabricate barrier or structural layers, the resulting layers are rough and granular. These are defects which cause unwanted flow discontinuities, obstructions and turbulence within the ink channels. On the other hand, the materials commonly used for integrated circuits are unusable because they are optimized to resolve dimensions on the order of 1 micron. When used to fabricate layers having thickness of approximately 25 microns, most integrated circuit materials lose all resolution. The material to be removed from the channels becomes too polymerized and can not be removed by conventional techniques.

The third problem is adhesion of the photopolymer layer to the substrate and/or to the nozzle plate. As mentioned above, conventional ink-jet printheads may comprise nozzle plates having a metal surface of palladium or gold. Also, the active electronic components realized on the substrate often comprise metal surfaces of gold or other materials showing low adhesion characteristics. Further, the adhesion of the photopolymer layer to the substrate and/or to the nozzle plate is also jeopardized by the mechanical strength of the photopolymer material, in particular when the manufacturing process of the print head requires thermal treatments. The thermal treatments promote the formation of mechanical stress which cannot be compensated by a material having high mechanical strength.

U.S. Pat. No. 5,150,132 describes an ink resistant material useful to make any component, particularly a top plate, of a printhead having a surface contacting the ink. The material is disclosed to have high glass transition point and excellent heat resistant properties. The component of the printhead is disclosed to be realized by molding, preferably by casting molding, compression molding or compression molding.

U.S. Pat. No. 5,478,606 discloses an ink-jet printhead comprising a structural layer formed by curing a radiation curable resin composition comprising an epoxy resin, such as, for example, those obtained from the reaction product between bisphenol A and epichlorohydrin, the reaction product between bromine-containing bisphenol A and epichlorohydrin, the reaction product between phenolic novolak or o-cresol novolak and epichlorohydrin, and the polyfunctional epoxy resins having oxycyclohexane skeleton. The resulting structural layer showed an excellent mechanical strength, adhesion and ink resistance. Moreover, in case of solid epoxy resin, at room temperatures, the patterning characteristics are also excellent.

U.S. Pat. Nos. 6,455,112 and 6,638,439 disclose the use of polyfunctional epoxy resins having oxycyclohexane skeleton to form structural layers of an ink-jet printhead.

U.S. Pat. No. 6,793,326 discloses that structural layers made of cationic polymerized product of alicyclic epoxy resins showed a peeling in case of high internal stress because of a high mechanical strength. The proposed solution suggests making the structural layer by curing a radiation curable resin composition comprising an epoxy resin having at least two epoxy groups and obtained from the polymerization of acrylic monomers bearing epoxy groups.

U.S. Pat. No. 6,193,359 discloses an ink-jet printhead comprising a barrier layer formed by curing a radiation curable resin composition comprising from 5 to 50 weight percent of a first multifunctional epoxy compound, typically a difunctional epoxy compound, from about 0.05 to about 20 weight percent of a second multifunctional epoxy compound, from about 1.0 to about 10 weight percent of a photoinitiator, and from about 20 to about 90 weight percent of a non photoreactive solvent. The cured composition is told to have greater resolution, higher aspect ratios, enhanced adhesion to metal surfaces, and resistance to ink chemical attack. However, the examples of the specification demonstrate that such a composition does not show a good adhesion to conventional nozzle plates.

The foregoing status of the art thus indicates that there is a need for a continuous research and improvement for a photopolymer layer material which can withstand the corrosion of high pH inks, provide the required ink channel resolution, stop delamination of the photopolymer layer from metal surfaces of gold or other metals showing low adhesion characteristics, and be easily employed in manufacturing processes.

The Applicant has noticed that when materials having a high glass transition point, particularly higher than 180° C., are employed to make a photopolymer layer, the high glass transition point gave to the material an excessive mechanical strength favoring the detachment of the layer from metal surfaces of gold or other metals showing low adhesion characteristics. Further, the use of molding techniques to realize the barrier or structural layer of a printhead is difficult and expensive in view of the reduced dimensions, in the order of some micrometers, connected with the manufacturing thereof.

Moreover, the Applicant has also noticed that the high mechanical strength and Tg of the epoxy resin radiation curable resin compositions promotes the detachment of the photopolymer layer from metal surfaces of gold or other metals showing low adhesion characteristics.

Additionally, the Applicant has also noticed that the epoxy resin obtained from the polymerization of acrylic monomers bearing epoxy groups did not show the optimal adhesion characteristics required to form a photopolymer layer of an ink-jet printhead.

Finally, the Applicant has noticed that the generally higher amount of difunctional epoxy compounds and solvent employed reduced the viscosity of the radiation curable resin composition so making it difficultly coatable by spin coating.

SUMMARY OF THE INVENTION

The present invention relates to an ink-jet print head comprising a polymeric material layer defining ink passage ways formed on a substrate, said polymeric material layer being formed by curing a radiation curable resin composition comprising a cyclic aliphatic multifunctional epoxy resin comprising at least three epoxy groups, a cyclic aliphatic difunctional epoxy resin and a photoinitiator.

In another aspect, the present invention relates to a process for manufacturing an ink jet printhead comprising a polymeric material layer defining ink passage ways and ejection chambers formed on a substrate, said process comprising the step of:

providing a substrate comprising a plurality of ink ejection energy generating elements on a surface thereof, applying a layer of curable resin composition on said surface of said substrate, and curing said layer of curable resin composition so as to form said polymeric material layer, wherein the radiation curable resin composition comprises a cyclic aliphatic multifunctional epoxy resin comprising at least three epoxy groups, a cyclic aliphatic difunctional epoxy resin and a photoinitiator.

In a further aspect, the present invention relates to a curable resin composition comprising a cyclic aliphatic multifunctional epoxy resin, a cyclic aliphatic difunctional epoxy resin, and, optionally, a photoinitiator.

The Applicant has found that the photopolymer layer made with the curable resin composition described hereinbelow can withstand the corrosion of alkaline pH inks.

Further, the Applicant has found that the curable resin composition described hereinbelow can provide the required ink channel resolution for a polymeric material layer defining ink passage ways of an ink jet printhead.

Additionally, the Applicant has found that the photopolymer layer made with the curable resin composition described hereinbelow does not delaminate from metal surfaces of gold or other metals showing low adhesion characteristics.

Finally, the Applicant has found that the curable resin composition described hereinbelow can be easily handled and employed in manufacturing processes.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
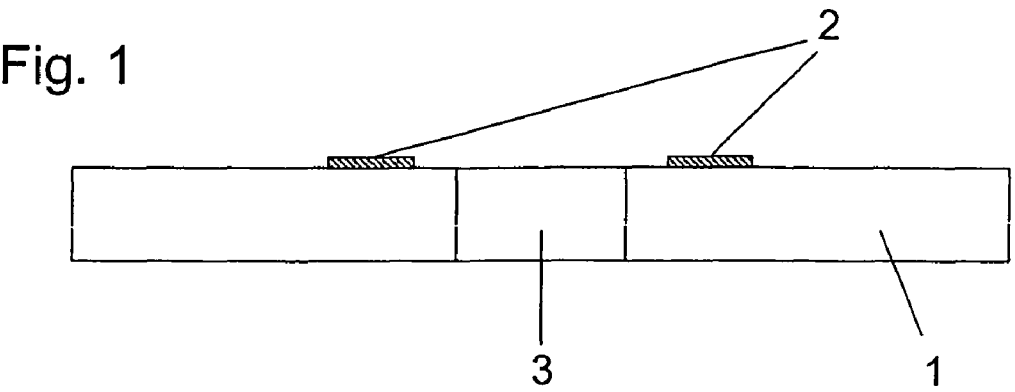
FIG. 1 shows a schematic section view of a substrate for an ink jet printhead.

Accordingly, the present invention relates to an ink-jet print head comprising a polymeric material layer defining ink passage ways formed on a substrate, said polymeric material layer being formed by curing a radiation curable resin composition comprising a cyclic aliphatic multifunctional epoxy resin comprising at least three epoxy groups, a cyclic aliphatic difunctional epoxy resin and a photoinitiator.

Preferably, the curable resin composition can be represented by the following general formulas A1 or A2

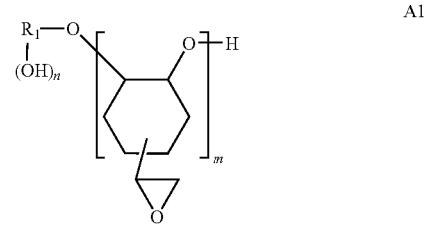

A1

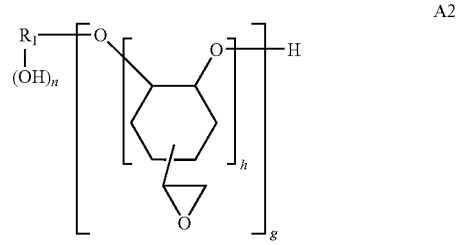

A2 wherein $R_1$ is a linear or branched alkylene group, m is an integer of from 3 to 20, n is an integer of from 0 to 5, h is an integer of from 1 to 5, and g is an integer of from 1 to 3, with the proviso that the result of h multiplied per g is at least 3.

The curable resin composition also comprises (2) a cyclic aliphatic difunctional epoxy resin represented by the following general formula B

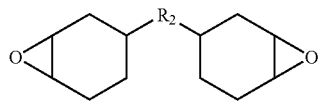

wherein $R_2$ is a carboxyalkylene group of formula —$(CH_2)_p$—COO— or —$(CH_2)_q$—COO—$(CH_2)_r$—OOC—$(CH_2)_s$— and p, q, r, and s each independently is an integer of from 1 to 9, and (3), preferably, a photoinitiator.

In the above mentioned formulas A1 and A2, n is preferably an integer fro 1 to 3 and $R_1$ is a linear or branched alkylene group preferably having from 1 to 15 carbon atoms, more preferably from 1 to 10, and most preferably from 2 to 8. Useful examples of linear or branched alkylene chains represented by the group —$R_1$—$(OH)_n$ can be —$CH_3$, —$C_2H_5$, —$C_2H_4OH$, —$C_2H_3(OH)_2$, —$C_3H_7$, —$C_3H_6OH$, —$C_3H_5(OH)_2$, —$C_4H_9$, —$C_4H_8OH$, —$C_4H_7(OH)_2$, —$C_5H_{11}$, —$C_5H_{10}OH$, —$C_5H_8(OH)_3$, —$C_6H_{13}$, —$C_6H_{12}OH$, —$C_6H_{11}(OH)_2$, —$C_7H_{15}$, —$C_7H_{14}OH$, —$C_7H_{12}(OH)_3$. In the above mentioned formula A1, m is preferably an integer of from 5 to 15. In the above mentioned formula A2, h is preferably an integer of from 3 to 5, and g is preferably an integer of from 2 to 3.

Useful examples of multifunctional epoxy resin represented by the general formula A1 and A2 are commercial products distributed by Daicel Chemical Industries, Ltd. under the tradename EHPE 3150, EHPE 3180, Epolite GT300, and Epolite GT400, by Ciba Specialty Company under the tradename Araldite CY-179, Araldite CY-178, Araldite CY-182 and Araldite CY-183.

The curable resin composition preferably comprises from 20 to 70 weight percent of the multifunctional epoxy resin. According to a more preferred embodiment, the curable resin composition preferably comprises from 20 to 50 weight percent of the multifunctional epoxy resin.

In the above mentioned formula B, p, q, r, and s each independently is preferably an integer of from 1 to 5. In the above mentioned formula B, $R_2$ is preferably a carboxyalkylene group of formula —$CH_2$—COO—, —$(CH_2)_2$—COO—, —$(CH_2)_3$—COO—, —$(CH_2)_4$—COO—, —$CH_2$—COO—$CH_2$—OOC—$CH_2$—, —$(CH_2)_2$—COO—$CH_2$—OOC—$(CH_2)_2$—, —$(CH_2)_3$—COO—$CH_2$—OOC—$(CH_2)_3$—, —$(CH_2)_3$—COO—$(CH_2)_2$—OOC—$(CH_2)_3$—.

Useful examples of difunctional epoxy resin represented by the general formula B are commercial products distributed by Dow Chemical Company under the tradename Cyracure UVR-6110, Cyracure UVR-6107, Cyracure UVR-6105, and Cyracure UVR-6128, and by Daicel Chemical Industries, Ltd. under the tradename Celloxide 2021P, Celloxide 2081, and Celloxide 3000.

The curable resin composition preferably comprises from 5 to 40 weight percent of the difunctional epoxy resin. According to a more preferred embodiment, the curable resin composition preferably comprises from 15 to 35 weight percent of the difunctional epoxy resin.

In another aspect, the present invention relates to a curable resin composition comprising the above described cyclic aliphatic multifunctional epoxy resin comprising at least three epoxy groups, and a cyclic aliphatic difunctional epoxy resin. The curable resin composition of the invention can be radiation cured or thermal cured. In a preferred embodiment of the invention, the curable resin composition of the present invention comprises a photoinitiator.

Useful examples of photoinitiator include cationic photoinitiators. The use of a cationic photoinitiators in the epoxy resin composition is preferred because the cationic polymerized substance of the epoxy resin has a relatively high crosslinking density resulting in a desired Tg comprised in the range of from 100 to 180° C., preferably from 120 to 160° C. and shows excellent characteristics as a structural material. Another advantage of the use of cationic photoinitiators is that such kind of initiator is not sensitive to the oxygen and the reaction can be performed under normal atmosphere. The cationic photoinitiators can be chosen amongst any compound which releases a Lewis acid or a Bronsted acid on irradiation of an active energy ray, such as, for example, aryldiazonium salts (Ar—$N_2^+X^-$), diaryl iodonium salts ($Ar_2I^+X^-$), triaryl sulfonium salts ($Ar_3S^+X^-$), dialkyl phenacyl sulfonium salts and dialkyl-4-hydroxyphenyl sulfonium salts, Fe-arene compounds, and silanol-aluminum complexes. Most preferred examples of photoinitiators are aromatic iodonium salts and aromatic sulfonium salts, such as, for example, triarylsulfonium esafluorophosphate (Cyracure UVI-6992, Dow Chemical Company) and triarylsulfonium esafluorophosphate (Cyracure UVI-6976, Dow Chemical Company).

The radiation curable resin composition preferably comprises from 1 to 10 weight percent of the photoinitiator. According to a more preferred embodiment, the radiation curable resin composition preferably comprises from 1 to 5 weight percent of the photoinitiator.

The curable resin composition of the present invention can comprise further ingredients as known in the art. For example, the resin composition can comprise adhesion promoters, surfactants, sensitizers, reducing agents, fillers and the like.

According to a preferred embodiment of the present invention, the curable resin composition of the present invention can comprise a non photoreactive thermal polymerizable compound, i.e., a compound able to polymerize under thermal treatment, but not reactive under exposure to radiations in the visible or near visible region of the electromagnetic spectrum in the presence of the above mentioned cationic polymerization initiators only.

The non photoreactive compound is preferably an aliphatic lactone. Lactones are formed when the acid and alcohol functions are part of the same molecule. In other words, they are cyclic esters and occur in a wide range of natural substances or can be easily synthesized according to methods known in the art. Preferably, the lactones useful in the present invention have the following general formula:

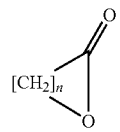

wherein n is an integer of from 1 to 20, preferably from 3 to 15, and preferably from 4 to 10. Useful examples of lactones include propiolactone (n=2), butyrolactone (n=3), valerolactone (n=4), and caprolactone (n=5).

The thermal polymerizable compound is particularly useful in case the curable resin composition of the present invention is in a liquid state during the working conditions. The thermal polymerizable compound can undergo a polymerization reaction under thermal treatment such as for example by heating the curable resin composition of the present invention for a period of time of from 10' to 60' at a temperature of from 120 to 180° C. The polymerization of the thermal polymerizable compound increase the viscosity of the curable resin composition of the present invention until to make it substantially solid and untacky to the touch. The Applicant has found that under these conditions, the curable resin composition is much more handeable and can be easily further processed.

The curable resin composition preferably comprises from 10 to 40 weight percent of the thermal polymerizable compound. According to a more preferred embodiment, the curable resin composition preferably comprises from 15 to 30 weight percent of the thermal polymerizable compound.

According to a preferred embodiment of the present invention, when using the above described thermal polymerizable compound, the curable resin composition of the present invention can comprise a thermal polymerization initiator able to promote the start of the polymerization reaction. According to a preferred embodiment, the thermal polymerization initiator is a compound able to open the lactone ring and to start the formation of the polyester by reaction of the carboxylic group of an opened lactone molecule with the hydroxy group of another lactone molecule. Useful examples are represented by compounds having at least one acid hydrogen such as, for example, aliphatic and aromatic amides, aliphatic and aromatic alcohols, aliphatic and aromatic diols, aliphatic and aromatic polyols, phenols, and the like. Preferably, fluorinated aliphatic and aromatic alcohols are used.

The curable resin composition preferably comprises from 1 to 20 weight percent of the thermal polymerization initiator. According to a more preferred embodiment, the curable resin composition preferably comprises from 5 to 15 weight percent of the thermal polymerization initiator.

According to a preferred embodiment of the present invention, the curable resin composition of the present invention can comprise an adhesion promoter. The adhesion promoter, useful to further improve the adhesion of the resulting photopolymer layer, can comprise a transition metal chelate, a mercaptan, a thiol-containing compound, a carboxylic acid, an organic phosphoric acid, a diol, an alkoxysilane, a combination of an alkoxysilane and a hydroxy-functional polyorganosiloxane, or a combination thereof. The adhesion promoter can be an unsaturated or epoxy-functional compound. Suitable epoxy-functional compounds are known in the art and commercially available, see for example, U.S. Pat. Nos. 4,087,585; 5,194,649; 5,248,715; and 5,744,507 col. 4 5.

The adhesion promoter may preferably comprise an unsaturated or epoxy-functional alkoxysilane. Examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl) ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof.

The curable resin composition preferably comprises from 1 to 20 weight percent of the adhesion promoter. According to a more preferred embodiment, the curable resin composition preferably comprises from 3 to 15 weight percent of the adhesion promoter.

According to a preferred embodiment of the present invention, the curable resin composition of the present invention can comprise, when cured with an actinic energy ray and for the purpose of improving the radiation curing process, a radiation curing promoter or sensitizer in combination with the photoinitiator mentioned above. As the radiation curing promoter or sensitizer which is usable herein, sensitizing dyestuff such as (keto)cumalin, antracene, thioxantene, thioxanten-9-one, and perylene; and alkyl borates of such dyestuff as cyanine, rhodamine, safranine, malachite green, and methylene blue may be cited. These radiation curing promoters or sensitizers may be used independently either singly or in the form of a mixture of two or more members.

According to a preferred embodiment of the present invention, the curable resin composition of the present invention can comprise, when cured with thermal energy and for the purpose of improving the thermal curing process, a thermal curing promoter. As the radiation curing promoter or sensitizer which is usable herein, tertiary amines such as triethylamine, triethanolamine, 2-dimethylaminoethanol, N,N-(dimethylamino)ethyl benzoate, N,N-(dimethylamino) isoamyl benzoate, and pentyl-4-dimethylamino benzoate; thioethers such as β-thiodiglycol may be cited. These thermal curing promoters may be used independently either singly or in the form of a mixture of two or more members.

The curable resin composition preferably comprises from 0.1 to 10 weight percent of the curing promoters or sensitizers. According to a more preferred embodiment, the curable resin composition preferably comprises from 0.5 to 5 weight percent of the curing promoters or sensitizers.

The curable resin composition of the present invention may incorporate therein, when necessary, well-known and widely used additives such as an anti-foaming agent, an adhesiveness-imparting agent, and a leveling agent.

All percentage expressed above are referred to and based on 100 parts by weight of the curable resin composition of the present invention.

According to a another aspect, the present invention also relates to a process for manufacturing an ink jet printhead comprising a polymeric material layer defining ink passage ways formed on a substrate, said process comprising the steps of providing a substrate (1) comprising a plurality of ink ejection energy generating elements (2) on a surface thereof, applying a layer of curable resin composition on said surface of said substrate (1), and curing said layer of curable resin composition so as to form said polymeric material layer (5), wherein the curable resin composition comprises (1) a cyclic aliphatic multifunctional epoxy resin represented by the following general formulas A1 or A2

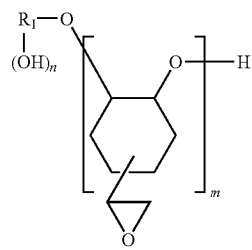

-continued

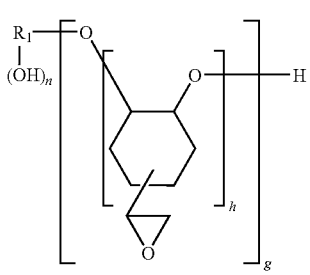

wherein $R_1$ is a linear or branched alkylene group, m is an integer of from 3 to 20, n is an integer of from 1 to 5, h is an integer of from 1 to 5, and g is an integer of from 1 to 3, with the proviso that the result of h multiplied per g is at least 3, (2) a cyclic aliphatic difunctional epoxy resin represented by the following general formula

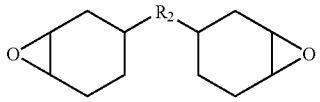

wherein $R_2$ is a carboxyalkylene group of formula $-(CH_2)_p-COO-$ or $-(CH_2)_q-COO-(CH_2)_r-OOC-(CH_2)_s-$ and p, q, r, and s each independently is an integer of from 1 to 9, and (3) a photoinitiator.

Having reference to FIG. 1, the substrate 1 of the inkjet printhead may be of any shape or any material as long as it can function as a part of the liquid flow path constituting member and as a support for the material layers that form the ink flow path and ink ejection nozzles to be described later. The substrate can be made from glass, metal, plastic, ceramic, or silicon.

On the substrate 1 are disposed a desired number of ink ejection energy generating elements 2 such as electrothermal converting elements or piezoelectric elements (in FIG. 1, two such elements 2 are exemplified). By the ink ejection energy generating elements 2, ejection energy for ejecting droplets of a recording liquid is imparted to the ink, and recording done. Incidentally, when an electrothermal converting element, e.g. a resistor, is used as the ink ejection energy generating element 2, this element heats a nearby recording liquid, to generate vapor bubbles in the recording liquid, thereby generating an ejection energy. When a piezoelectric element is used, on the other hand, an ejection energy is generated by its mechanical vibrations.

To these elements 2 are connected control signal input electrodes for causing these elements to act. In an attempt to improve the durability of these ejection energy generating elements, it is customary practice to provide various functional layers such as protective layers (not shown).

According to a preferred embodiment, the substrate typically includes a silicon substrate upon which is deposited a thin layer of silicon dioxide for passivating and insulating the surface of the silicon substrate. Metal trace conductors make electrical contact to the heater resistors for providing electrical pulses which selectively activate the resistors during an ink jet printing operation, and these conductors are formed from a layer of metal previously evaporated on the upper surface of the silicon layer using conventional metal evaporation processes. Aluminum or gold or copper are usually employed as the metal for trace conductors. A plurality of heater resistors are formed on the upper surface of the silicon dioxide layer and will typically be either tantalum aluminum or tantalum pentoxide and fabricated using known photolithographic masking and etching techniques.

After the formation of the metal conductors and heater resistors is completed, a protective layer, typically of silicon carbide and silicon nitride, and an anti-cavitation layer, typically made of tantalum, are deposited over the upper surfaces of the conductors and the heater resistors to protect these members from cavitation wear due to ejection of ink bubbles and ink corrosion which would otherwise be caused by the highly corrosive ink located in the ejection chambers directly above these heater resistors. The protective and anti-cavitation layers, as well as the previously identified $SiO_2$ surface layer, resistors and aluminum conductors are all formed using semiconductor processes well known to those skilled in thermal ink jet and semiconductor processing arts and for that reason are not described in detail herein.

FIG. 1 exemplifies a form in which an opening 3 for feeding ink is provided in the substrate beforehand, and ink is fed from an ink reservoir (not shown) behind the substrate. In forming the opening, any means can be used so long as it is capable of forming a hole in the substrate. For instance, mechanical means such as a drill, or a light energy such as laser may be employed. Alternatively, it is permissible to use photolithographic techniques by applying a photoresist pattern or the like on the substrate, and chemically etch it.

The curable resin composition of the present invention can be applied on the upper surface of the substrate, i.e., the surface comprising the metal conductors and the heater resistors, by using any method know in the art, such as, for example, spin coating or spray coating. A preferred method for applying the composition to the substrate involves centering the substrate on an appropriate sized chuck of either a resist spinner or conventional wafer resist deposition track. The curable resin composition of the present invention can be liquid at room temperature, and can be dispensed without the use of a solvent or diluent. However, a solvent or diluent can be added in certain case to adjust the viscosity of the composition. A solvent or diluent is always used in case the curable resin composition is solid at room temperature. Usually, the viscosity of the composition can be in the range of from 200 cPs to 400 cPs, preferably from 250 to 350 cPs. If the viscosity is too low, it is difficult to get a layer having the proper thickness because the liquid composition easily flows on the substrate. If the viscosity is too high, it is difficult to get a good thickness uniformity because the liquid composition slowly flows on the substrate. The composition is either dispensed by hand or mechanically into the center of the substrate. The chuck holding the substrate is then rotated at a predetermined number of revolutions per minute to evenly spread the composition from the center of the substrate to the edge of the substrate. The rotational speed of the substrate may be adjusted or the viscosity of the material may be altered to vary the resulting film thickness. The resulting coated substrate is then removed from the chuck either manually or mechanically and, if necessary, subjected to a thermal treatment by placing on either a temperature controlled hotplate or in a temperature controlled oven. This optional thermal treatment removes, if present, a portion of the solvent from the liquid resulting in a partially dried film on the substrate. Additionally, the optional thermal treatment promotes the polymerization of the non photoreactive thermal polymerizable compound, if present in the composition. As mentioned above, the use of the non photoreactive thermal polymerizable compound is particularly useful when the curable resin composition is in a liquid state. In such a case, the thermal treatment is controlled to maintain the temperature in the range of from 120° to 180° and preferably from 150° to 170° C. for a time period of 10' to 60' and preferably from 30' to 50' until the material has become untacky to the touch. The Applicant has found that under these conditions, the curable resin composition is much more handeable and can be easily further processed. The substrate is then removed from the heat source and allowed to cool to room temperature.

The ink passage ways defined by the polymeric material layer formed by curing the curable resin composition of the present invention are realized by any method known in the art.

For example, the ink passage ways can be defined by forming a structural layer wherein both the barrier layer and the nozzle plate are integrally realized within a layer formed from the curable resin composition of the present invention. Alternatively, the ink passage ways can be defined by first forming a barrier layer with the curable resin composition of the present invention and then applying to the barrier layer a separately formed nozzle plate.

Figure 2:
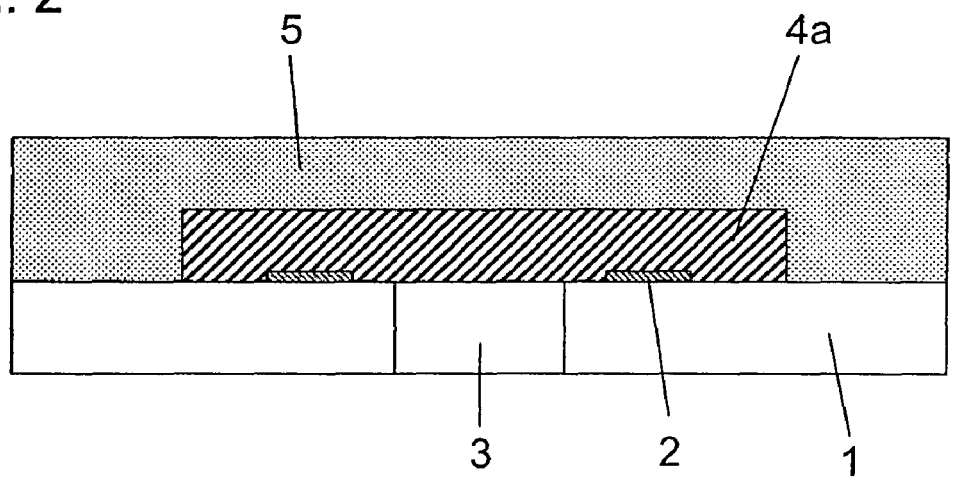
FIG. 2 shows a schematic section view of a semifinished ink jet printhead with a structural layer.
Figure 3:
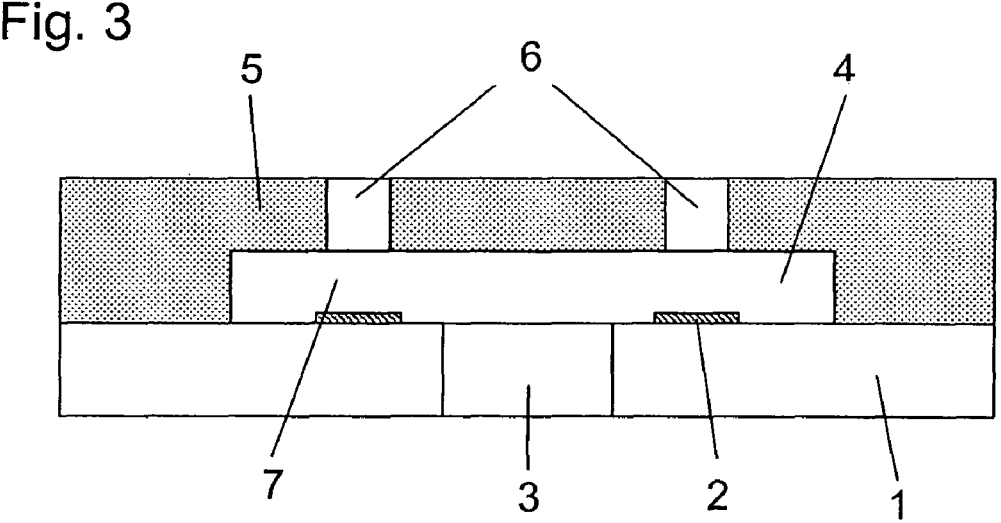
FIG. 3 shows a schematic section view of a finished ink jet printhead with a structural layer.

Having reference to FIGS. 2 and 3, when a structural layer is formed, the ink passage ways are formed by realizing a pattern 4a before applying the radiation curable resin composition of the present invention. The most common process employed for forming the pattern 4a is a photolithographic process using a photosensitive material, usually a dissoluble resin, but other processes such as screen printing or galvanic metal deposition can be employed.

When the photosensitive material is used, a positive resist can be preferably used. The photosensitive positive resist is applied to the substrate by any method known in the art in order to form a film having the desired thickness. In order to define the pattern 4a in the resulting film, the material must be masked, exposed to a ultraviolet light source, baked after exposure and developed to define the final pattern 4a by removing unneeded material. This procedure is very similar to a standard semiconductor lithographic process. The mask is a clear, flat substrate usually glass or quartz with opaque areas defining the pattern 4a to be maintained from the coated film. The developer comes in contact with the coated substrate through either immersion and agitation in a tank-like setup or by spray. Either spray or immersion of the substrate will adequately remove the excess material as defined by the photo masking and exposure.

Alternatively, when galvanic metal deposition is employed in order to define the pattern 4a, a photosensitive positive resist is applied to the substrate by any method known in the art in order to form a film having the desired thickness. With a mask not shown in any of the figures, the photoresist is exposed to ultraviolet radiation only in correspondence with the zones where the metal has to be deposited, i.e., the zones corresponding to the ejection chambers and the connecting channels. Finally development is effected, during which the portion of depolymerized photoresist is removed, leaving in this way cavities having the shape of the ejection chambers and the connecting channels. In a further step, electrodeposition is performed of a metal, for example copper, gold or nickel, inside the cavities previously made, in order to form the pattern 4a.

On the pattern 4a of dissoluble resin material or metal a polymeric layer 5 is formed, as illustrated in FIG. 2, by applying the curable resin composition of the present invention.

As mentioned above, the curable resin composition of the present invention can be in a liquid state, and in such a case, preferably comprises a thermal polymerizable compound. In these conditions, after the application, the curable resin composition of the present invention is subjected to a thermal treatment for a period of time of from 10' to 60' at a temperature of from 120 to 180° C. in order to polymerize the thermal polymerizable compound and increase the viscosity of the curable resin composition of the present invention until to make it substantially solid and untacky to the touch. In case the curable resin composition is solid, the composition is dissolved in a proper solvent and applied as described above. The evaporation of the solvent is conducted by heating the coated substrate, optionally under low pressure conditions.

After that, as depicted in FIG. 3, a pattern of ejection nozzles 6 are made in the polymeric layer 5 in correspondence with the ejection resistors 2 and the ejection chambers 7 by using techniques well known in the art such as, for example, photolithographic, plasma etching, chemical dry etching, reactive ion etching, or laser etching techniques. The dissoluble resin (or any other removable material) forming the pattern 4a of the ink passage ways is finally dissolved with a proper solvent. The dissolution is easily performed by dipping the substrate in the solvent or spraying the solvent on the substrate. Joint use of ultrasonic waves can shorten the duration of dissolution.

Figure 4:
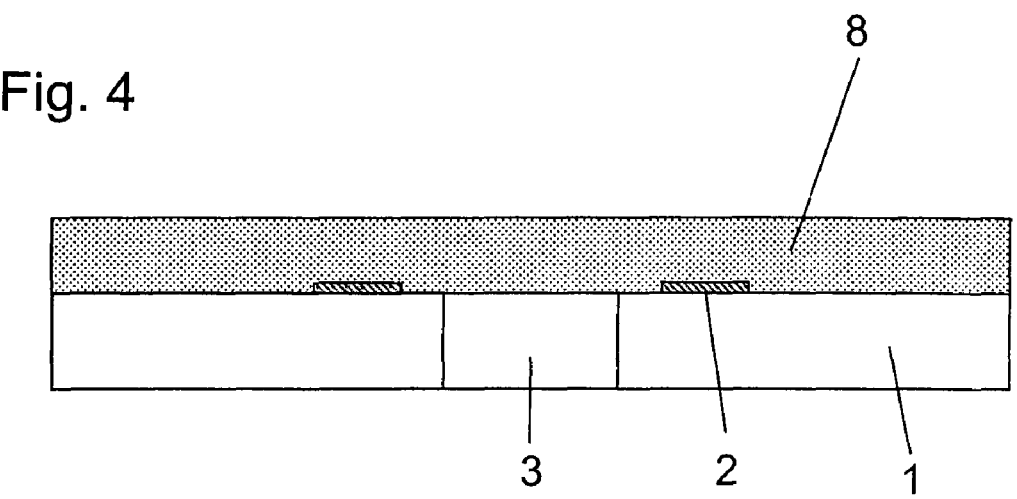
FIGS. 4 and 5 show a schematic section view of a semifinished ink jet printhead with a barrier layer at two different steps of its manufacturing process.
Figure 5:
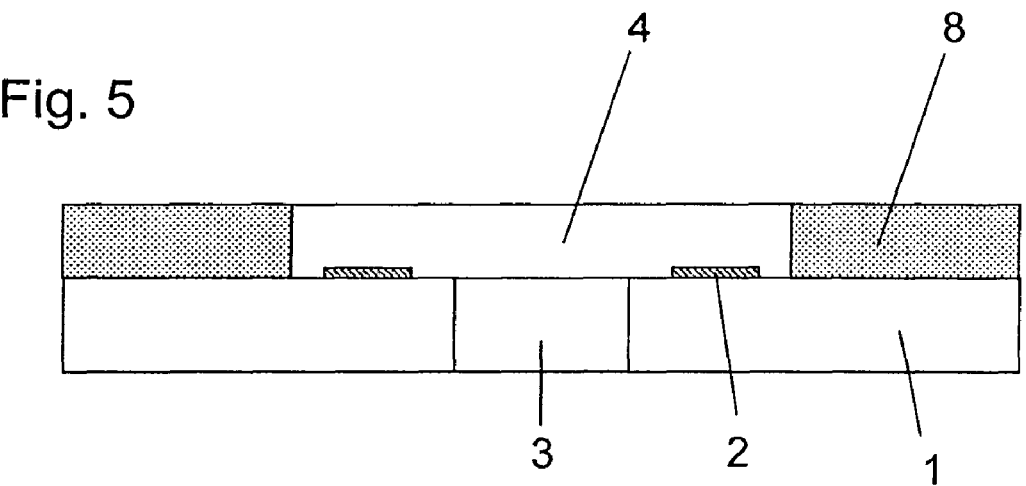
Figure 6:
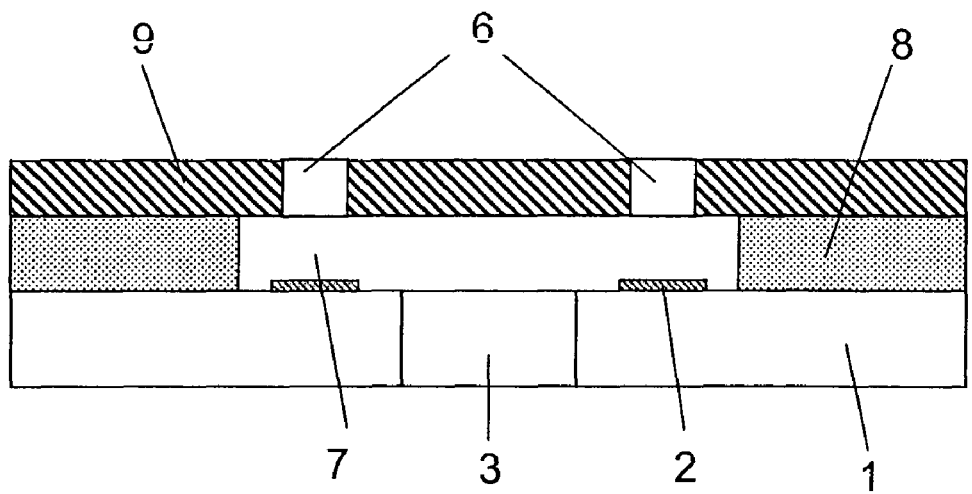
FIG. 6 shows a schematic section view of a finished ink jet printhead with a barrier layer.

According to another embodiment, having reference to FIGS. 4 and 5, when a barrier layer is formed, the ink passage ways 4 are formed by realizing a pattern within the barrier layer 8 formed with the curable resin composition of the present invention after its application on the substrate 1. Similarly to what described above for defining the pattern 4a within the dissoluble resin, the curable resin composition of the present invention can be masked, exposed to a collimated ultraviolet light source, baked after exposure and developed to define the final pattern by removing unneeded material. The mask is a clear, flat substrate usually glass or quartz with opaque areas defining the pattern to be removed from the coated film. Finally, a nozzle plate 9 is secured to the barrier layer 8 so that the nozzles 6 are in precise alignment with the ink ejectors 2 on the substrate 1 and the ink vaporization chambers 7 of the barrier layer 8. This is accomplished by placing the bottom surface of the nozzle plate 9 against and in physical contact with the upper face of the barrier layer 8. Specifically, the bottom surface of the nozzle plate 9 is urged toward and against the upper surface of the barrier layer 8 which will self-adhere the barrier layer 8 to the nozzle plate 9. Preferably, the nozzle plate 9 and the barrier layer 8 are joined by thermocompression bonding method, which comprises the application of a pressure at relatively high temperature. For example, during physical engagement between the nozzle plate 9 and the barrier layer 8, both of these components are subjected (e.g. heated) to a temperature of about 160-250° C., with pressure levels of about 75-250 psi being exerted on such components. A conventional heated pressure-exerting platen apparatus may be employed for this purpose. The exact temperature and pressure levels to be selected in a given situation may be determined in accordance with routine preliminary testing taking into consideration the particular materials being used in connection with the barrier layer and the nozzle plate.

Figure 7:
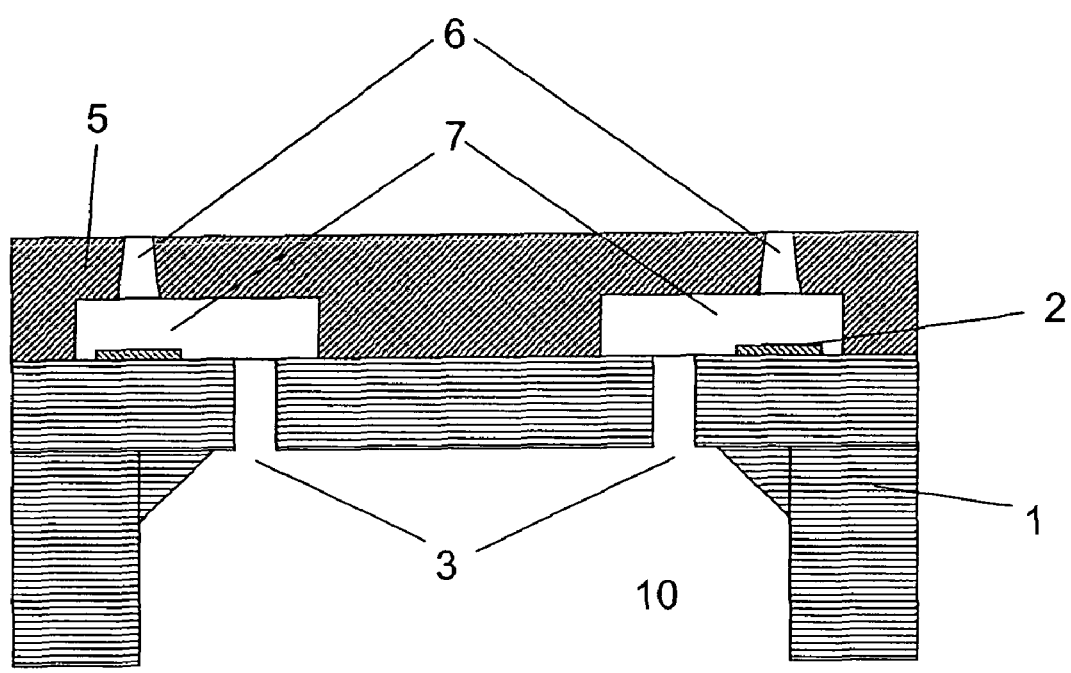
FIG. 7 shows a schematic section view of an alternative finished ink jet printhead with a structural layer.

FIG. 7 represents a schematic section view of an alternative embodiment of an ink jet printhead with a structural layer 5 made of the curable resin composition of the present invention. In this embodiment, a slot 10 communicating with several ducts 3 are made in the substrate 1 in order to provide ink to the ejection chambers 7. Each ejection chamber 7 comprises an ejection nozzle 6 in correspondence with the ejection resistor 2.

The invention will be now described with reference to the following non-limiting example.

EXAMPLE 1

A set of radiation curable resin compositions according to Table 1 was prepared by mixing the ingredients on a magnetic stirrer for two hours at 25° C., but compositions A, B, and C that needed a slight heating at temperature lower than 50° C. in order to help dissolution.

All numbers expressed below are referred to and based on 100 parts by weight of the final radiation curable resin composition.

TABLE 1

| Ingredients | A | B | C | D | E | F | G |
|---|---|---|---|---|---|---|---|
| EHPE 3150 | 57.70 | 42.54 | 56.32 | — | 27.62 | — | 23.32 |
| Cyracure 6110 UVR | — | — | — | 47.25 | 27.62 | 56.30 | 32.94 |
| ε-Caprolactone | — | — | — | — | — | 22.45 | 22.90 |
| Diglyme | 23.09 | 22.86 | — | 30.69 | — | — | — |
| Cyclopentanone | — | — | 22.88 | — | 22.89 | — | — |
| 1,4-HFAB | 11.54 | 11.35 | 9.57 | 11.54 | 9.50 | 9.76 | 9.57 |
| Cyracure UVI 6992 | — | — | 3.43 | 4.00 | 4.00 | 4.00 | 3.43 |
| Cyracure UV 6976 | 1.73 | 3.10 | 1.45 | — | 2.00 | 0.50 | 1.55 |
| Silquest A-187 | 5.77 | 20.00 | 5.14 | 5.77 | 5.00 | 5.80 | 5.15 |
| Anthracene | — | — | 0.55 | 0.60 | 1.20 | 0.55 | 0.55 |
| Thioxanthene | — | — | 0.55 | — | — | 0.55 | 0.55 |
| DC 57 | 0.17 | 0.15 | 0.11 | 0.15 | 0.15 | — | 0.04 |
| BYK 310 | — | — | — | — | — | 0.09 | — |
| Total | 100.00 | 100.00 | 100.00 | 100.00 | 100.00 | 100.00 | 100.00 |

EHPE 3150 Tradename of a multifunctional epoxy resin manufactured by Daicel Chemical Industries, Ltd. and having formula

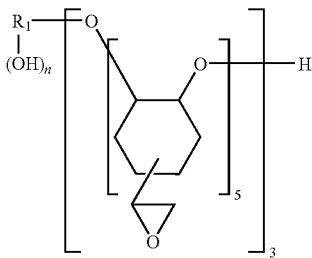

Cyracure 6110 UVR Tradename of a difunctional epoxy resin manufactured by Dow Chemical, Midland, Mich., USA and having formula

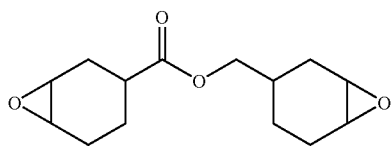

Diglyme Diethylene Glycol Dimethyl Ether 1,4-HFAB Fluorinated diol manufactured by Central Glass Co. Ltd., Japan and having formula

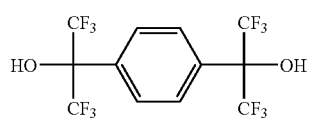

Cyracure UVI 6992 Tradename of a triarylsulfonium exafluorophosphate available from Dow Chemical, Midland, Mich., USA Cyracure UV 6976 Tradename of a triarylsulfonium exafluoroantimonate available from Dow Chemical, Midland, Mich., USA Silquest A-187 Tradename of a γ-glycidoxypropyltrimethoxysilane available from GE Advanced Materials Co., Wilton, Conn., USA DC 57 Tradename of a polysiloxane additive available from Dow Chemical, Midland, Mich., USA BYK 310 Tradename of a polyester modified dimethylpolysiloxane available from BYK-Chemie GmbH, Wesel, Germany Each composition A to G was spun coated on a substrate used to make a printhead for an inkjet printer comprising a silicon wafer having ejection resistors and gold plated active electronic components by means of a OPTIspin ST20 spinner manufactured by SSE Sister Semiconductor Equipment Gmbh at 1200 rpm for 15 seconds to provide a 25 μm thick structural layer which was subsequently heated on a hot plate at 150° C. for 10 minutes, masked and exposed in a Saturn Spectrum III stepper manufactured by Ultratech Stepper Inc., California and developed with a 1:1 W/W mixture of xylene and butane-2-one to provide sample printheads 1 to 7. In view of the low viscosity of the compositions D and F, Samples 4 and 6 had a coated film thickness of 3 μm.

After that, each sample 1 to 7 was subjected to a peeling test by using an adhesive tape BOPP 2.6 Mil/N86 2 Mil by Avery Dennison (Strongsville, Ohio) and to an aging test by immersing each sample at 65° C. for seven weeks in a conventional aqueous ink for ink-jet printing comprising about 5% of a suitable colorant, about 20% of an organic cosolvent, and about 5% of a non-ionic surfactant. The ink used in this test may contain several other common additives such as biocides, defoamers, levelling agents or others more.

The following Table 2 summarizes the results of the tests for each sample 1 to 7.

TABLE 2

| Sample | Peeling test | Aging test |
| --- | --- | --- |
| 1A (C) | Fair | Detachment start after 3 weeks |
| 2B (C) | Fair | Detachment start after 3 weeks |
| 3C (C) | Fair | Detachment start after 1 week |
| 4D (C) | Good | No detachment after 7 weeks |
| 5E (I) | Good | No detachment after 7 weeks |
| 6F (C) | Good | No detachment after 7 weeks |
| 7G (I) | Good | No detachment after 7 weeks |

(C) Comparison
(I) Invention

As reported in Table 2, all samples showed a good result in the peeling test. However, samples 1 to 3 clearly showed a bad resistance to ink in the aging test. Samples 4 and 6 showed good results in both the peeling and adhesion tests, but the thickness of the structural layer was unsuitable for the manufacturing of ink-jet print head. Samples 5 and 7 of the present invention showed good results in both the peeling and adhesion tests and the proper thickness for manufacturing of ink-jet print head. Sample 7, which comprises the thermal polymerizable compound (ε-caprolactone) had the further advantage of being solid before exposure, and then much more easily handled and processed.

The invention claimed is:

1. An ink-jet print head comprising a polymeric material layer defining ink passage ways formed on a substrate, said polymeric material layer being formed by curing a radiation curable resin composition comprising
   (1) a cyclic aliphatic multifunctional epoxy resin comprising at least three epoxy groups,
   (2) a cyclic aliphatic difunctional epoxy resin represented by the following general formula

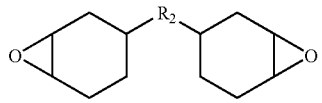

wherein $R_2$ is a carboxyalkylene group of formula $-(CH_2)_p-COO-$ or $-(CH_2)_q-COO-(CH_2)_r-OOC-(CH_2)_s-$ and p, q, r, and s each independently is an integer of from 1 to 9,
   and
   (3) a photoinitiator.

2. The ink-jet print head according to claim 1, wherein said cyclic aliphatic multifunctional epoxy resin is represented by the following formula:

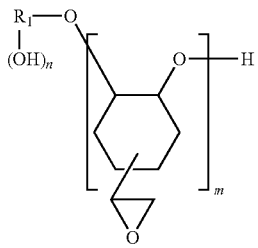

wherein $R_1$ is a linear or branched alkylene group, m is an integer of from 3 to 20 and n is an integer of from 1 to 5.

3. The ink-jet print head according to claim 1, wherein said cyclic aliphatic multifunctional epoxy resin is represented by the following formula:

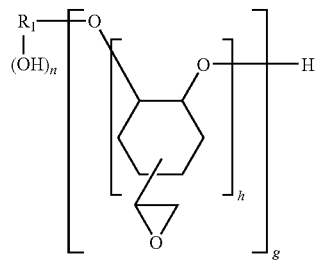

wherein $R_1$ is a linear or branched alkylene group, n is an integer of from 1 to 5, h is an integer of from 1 to 5, and g is an integer of from 1 to 3, with the proviso that the result of h multiplied per g is at least 3.

4. The ink-jet print head according to claim 1, wherein said curable resin composition comprises from 20 to 70 weight percent of said multifunctional epoxy resin based on the total weight of said curable resin composition.

5. The ink-jet print head according to claim 1, wherein p, q, r, and s each independently is an integer of from 1 to 5.

6. The ink-jet print head according to claim 1, wherein $R_2$ is a carboxyalkylene group selected from the group consisting of $-CH_2-COO-$, $-(CH_2)_2-COO-$, $-(CH_2)_3-COO-$, $-(CH_2)_4-COO-$, $-CH_2-COO-CH_2-OOC-CH_2-$, $-(CH_2)_2-COO-CH_2-OOC-(CH_2)_2-$, $-(CH_2)_3-COO-CH_2-OOC-(CH_2)_3-$, and $-(CH_2)_3-COO-(CH_2)_2-OOC-(CH_2)_3-$.

7. The ink-jet print head according to claim 1, wherein said curable resin composition comprises from 5 to 40 weight percent of said difunctional epoxy resin based on the total weight of said curable resin composition.

8. The ink-jet print head according to claim 1, wherein said photoinitiator is a cationic photoinitiator.

9. The ink-jet print head according to claim 1, wherein said radiation curable resin composition comprises from 1 to 10 weight percent of said photoinitiator based on the total weight of said curable resin composition.

10. The ink-jet print head according to claim 1, wherein said radiation curable resin composition comprises a non photoreactive thermal polymerizable compound.

11. The ink-jet print head according to claim 10, wherein said non photoreactive thermal polymerizable compound is an aliphatic lactone.

12. The ink-jet print head according to claim 11, wherein said aliphatic lactone has the following general formula:

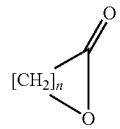

wherein n is an integer of from 1 to 20.

13. The ink-jet print head according to claim 12, wherein n is an integer of from 3 to 15.

14. The ink-jet print head according to claim 12, wherein said aliphatic lactone is selected from the group consisting of propiolactone, butyrolactone, valerolactone, and caprolactone.

15. The ink-jet print head according to claim 12, wherein said aliphatic lactone is ε-caprolactone.

16. The ink-jet print head according to claim 10, wherein said curable resin composition comprises from 10 to 40 weight percent of said thermal polymerizable compound based on the total weight of said curable resin composition.

17. The ink-jet print head according to claim 10, wherein said curable resin composition comprises a thermal polymerization initiator.

18. The ink-jet print head according to claim 17, wherein said thermal polymerization initiator is a compound selected from the group consisting of aliphatic and aromatic amides, aliphatic and aromatic alcohols, aliphatic and aromatic diols, aliphatic and aromatic polyols, and phenols.

19. The ink-jet print head according to claim 17, wherein said thermal polymerization initiator is a compound selected from the group consisting of fluorinated aliphatic and aromatic alcohols.

20. The ink-jet print head according to claim 17, wherein said curable resin composition comprises from 1 to 20 weight percent of said thermal polymerization initiator based on the total weight of said curable resin composition, 21. The ink-jet print head according to claim 1, wherein said curable resin composition comprises an adhesion promoter.

22. The ink-jet print head according to claim 21, wherein said adhesion promoter is a compound selected from the group consisting of a transition metal chelate, a mercaptan, a thiol-containing compound, a carboxylic acid, an organic phosphoric acid, a diol, an alkoxysilane, a combination of an alkoxysilane and a hydroxy-functional polyorganosiloxane, and a combination thereof.

23. The ink-jet print head according to claim 21, wherein said adhesion promoter is a epoxy-functional alkoxysilane selected from the group consisting of 3-glycidoxypropyltrimethoxysilane, 3-glycidoxypropyltriethoxysilane, (epoxycyclo hexyl) ethyldimethoxysilane, (epoxycyclohexyl)ethyldiethoxysilane and combinations thereof.

24. The ink-jet print head according to claim 21, wherein said adhesion promoter is a unsaturated alkoxysilane selected from the group consisting of vinyltrimethoxysilane, allyltrimethoxysilane, allyltriethoxysilane, hexenyl-trimethoxysilane, undecylenyltrimethoxysilane, 3-methacryloyloxypropyl trimethoxysilane, 3-methacryloyloxypropyl triethoxysilane,3-acryloyloxypropyl trimethoxysilane, 3-acryloyloxypropyl triethoxysilane, and combinations thereof.

25. The ink-jet print head according to claim 21, wherein said curable resin composition comprises from 1 to 20 weight percent of said adhesion promoter based on the total weight of said curable resin composition.

26. The ink-jet print head according to claim 1, wherein said substrate is made of a material selected from the group consisting of glass, metal, plastic, ceramic, and silicon.

27. A radiation curable resin composition comprising
(1) a cyclic aliphatic multifunctional epoxy resin represented by the following general formulas A1 or A2

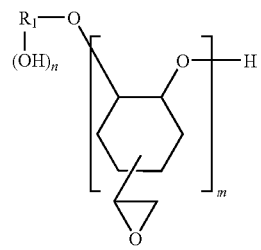

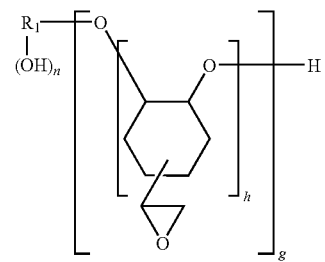

wherein $R_1$ is a linear or branched alkylene group, m is an integer of from 3 to 20, n is an integer of from 0 to 5, h is an integer of from 1 to 5, and g is an integer of from 1 to 3, with the proviso that the result of h multiplied per g is at least 3, (2) a cyclic aliphatic difunctional epoxy resin represented by the following general formula

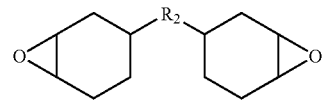

wherein $R_2$ is a carboxyalkylene group of formula $-(CH_2)_p-COO-$ or $-(CH_2)_q-COO-(CH_2)_r-OOC-(CH_2)_s-$ and p, q, r, and s each independently is an integer of from 1 to 9, (3) a photoinitiator; and
(4) an aliphatic lactone.

28. A curable resin composition comprising
(1) from 20 to 70 weight percent of a cyclic aliphatic multifunctional epoxy resin represented by the following general formulas A1 or A2

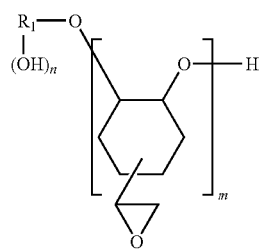

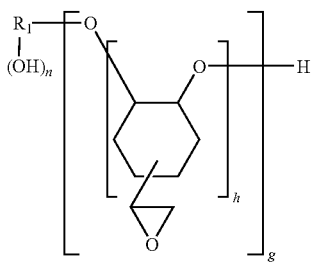

wherein $R_1$ is a linear or branched alkylene group, m is an integer of from 3 to 20, n is an integer of from 0 to 5, h is an integer of from 1 to 5, and g is an integer of from 1 to 3, with the proviso that the result of h multiplied per g is at least 3, and (2) from 5 to 40 weight percent of a cyclic aliphatic difunctional epoxy resin represented by the following general formula

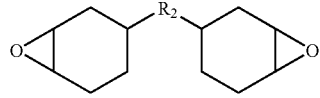

wherein $R_2$ is a carboxyalkylene group of formula $-(CH_2)_p-COO-$ or $-(CH_2)_q-COO-(CH_2)_r-OOC-(CH_2)_s-$ and p, q, r, and s each independently is an integer of from 1 to 9, and (3) an aliphatic lactone wherein the weight percent is based on the total weight of said radiation curable resin composition.

* * * * *